United States Patent
Watanabe et al.

(10) Patent No.: US 7,008,609 B2
(45) Date of Patent: Mar. 7, 2006

(54) METHOD FOR PRODUCING HYDROGEN GAS UTILIZING MECHANO-CORROSIVE REACTION

(75) Inventors: Masao Watanabe, Hokkaido (JP); Yoko Watanabe, Hokkaido (JP)

(73) Assignee: Dynax Corporation, Chitose (JP), part interest ( * ) Notice: Subject to any disclaimer, the term of this patent is extended or adjusted under 35 U.S.C. 154(b) by 221 days.

(21) Appl. No.: 10/658,106

(22) Filed: Sep. 9, 2003

(65) Prior Publication Data
US 2004/0208820 A1 Oct. 21, 2004

(30) Foreign Application Priority Data
Sep. 11, 2002 (JP) .............................. 2002-265019
Aug. 28, 2003 (JP) .............................. 2003-304105

(51) Int. Cl.
*C01B 3/08* (2006.01)
*C01F 7/42* (2006.01)
(52) U.S. Cl. ...................... 423/657; 423/627
(58) Field of Classification Search ................ 423/657, 423/627
See application file for complete search history.

(56) References Cited

U.S. PATENT DOCUMENTS 6,506,360 B1 * 1/2003 Andersen et al. ............ 423/657
6,638,493 B1 * 10/2003 Andersen et al. ............ 423/657

FOREIGN PATENT DOCUMENTS

JP 2001031401 A * 2/2001

* cited by examiner

*Primary Examiner*—Stanley S. Silverman
*Assistant Examiner*—Ardith E. Hertzog
(74) *Attorney, Agent, or Firm*—Howson and Howson

(57) ABSTRACT

There is provided a method of producing hydrogen gas serving as fuel for a portable fuel cell, whereby hydrogen gas can be provided easily, safely, and at a low cost. To that end, the method of producing hydrogen gas comprises the steps of causing friction and mechanical fracture accompanying the friction to occur to a metallic material under water and increasing thereby chemical reactivity of atoms of the metallic material, in close proximity of the surface thereof; wherein water molecules are decomposed by accelerating corrosion reaction of water with the metallic material. Further, for the metallic material, an aluminum or aluminum alloy material is used as industrial waste including refuse and cutting chips (curls) of an industrial aluminum material. Meanwhile, pure water not substantially containing ionic impurities and organic molecules is used for the water.

13 Claims, 2 Drawing Sheets

METHOD FOR PRODUCING HYDROGEN GAS UTILIZING MECHANO-CORROSIVE REACTION

FIELD OF THE INVENTION

The invention relates generally to a method of producing hydrogen gas, and more particularly, to a method of producing hydrogen gas easily and safely "anywhere" "any time" by turning a metal highly reactive with water molecules into fine particles, and by utilizing mechano-corrosive reaction occurring in the surfaces of fine particles.

BACKGROUND OF THE INVENTION

In the research and development of a portable fuel cell, how to secure and supply hydrogen gas as fuel is an important technical problem to be solved. In connection with conventional methods of producing hydrogen gas, studies have been conducted on a method of decomposing water by use of photochemical reaction, a method of chemically converting city gas into hydrogen gas, a method of decomposing organic molecules with a strong acid, a method of synthesizing hydrogen gas by decomposing methanol together with water molecules through catalytic reaction, and so forth, and continual efforts have been made to put those methods to commercial application. There are also automobile makers studying on a method of obtaining hydrogen by reforming gasoline.

However, the method of decomposing water by use of photo-chemical reaction has drawbacks in that it is not suited for application to a portable type producer of hydrogen gas because a large catalyst area for receiving light is required, and in addition, a production rate of hydrogen is low, necessitating storage of hydrogen for many hours. Further, the method of decomposing organic molecules with a strong acid has a drawback in that methoding of the acid is accompanied by hazards. Still further, the method of decomposing methanol together with water molecules by catalytic reaction has drawbacks in that, for example, high temperature not lower than 150° C. is required, a method of converting CO molecules obtained as by-product into $CO_2$ molecules before discharging is required, and a large quantity of water is required because methanol is diluted with water before use. Meanwhile, research and development have been conducted for long time on a method of causing hydrogen gas to be evolved by use of a metal alloy for hydrogen storage in place of the methodes of producing hydrogen gas, however, this method has not reached a stage of commercial application as yet, and has a drawback in that there is the need for applying heat at the time of hydrogen evolution. Thus, with the conventional methodes, it is in reality difficult to produce hydrogen gas serving as a satisfactory fuel for the portable fuel cell.

Under the circumstances, it is an object of the present invention to provide a method of producing hydrogen gas serving as fuel for a portable fuel cell, whereby hydrogen gas can be provided at room temperature easily, safely and inexpensively.

SUMMARY OF THE INVENTION

There has generally been known mechano-chemical reaction, which is a phenomenon wherein when a solid material is subjected to a mechanical action and effect, such as friction, fracture, and so forth, mechanical energy thereof is accumulated in the form of abnormality such as lattice defect, crack, strain, and compounds (impurities) inside the material, resulting in an increase in chemical reactivity of the surface of the material. Such a phenomenon as described belongs sometimes in a discipline called tribology. Upon friction between solid materials such as metals, and so forth, there occur not only generation of sound and heat but also various physical or chemical phenomena such as light emission, evolution of electrons and ions, formation of surface compounds, and so forth.

With the method of producing hydrogen gas according to the present invention, hydrogen gas is produced basically by utilizing mechano-chemical reaction. More specifically, an aluminum material or aluminum alloy material is turned into fine particles by applying friction movement to the surface of the material, in isolation from air, to thereby cause the mechano-chemical reaction to occur, whereupon there occurs an increase in reactivity (corrosion reaction) of the fine particles with water molecules in the surface of the material. Friction and fracture are generated in the course of turning the aluminum material or aluminum alloy material into the fine particles under water. While the fine particles each having a fresh and new surface of aluminum are constantly created due to friction, numerous cracks and lattice defects are developed in surface layers of the fine particles, thereby further enhancing reactivity thereof with water molecules. The water molecules seep into minute cracks formed in the aluminum material or aluminum alloy material, whereupon decomposition of water proceeds inside the minute cracks. Of the mechano-chemical reaction, a reaction whereby new compounds are formed due to reactions of the water molecules with the material is called a mechano-corrosive reaction. As a result of the mechano-corrosive reaction according to the present invention, there are generated $Al(OH)_3$, $Al_2O_3$, and $AlH_3$.

There are several solid materials having high reactivity with water, made of, for example, carbon, magnesium, iron, and so forth. Since these materials each normally have the surface covered with an oxide and so forth, the reactivity thereof with water is low. However, if a face (referred to as "newly generated face") is created by removing or destroying the oxide and so forth, covering the surface of the respective materials, those materials intensely react with water. With the method according to the present invention, aluminum or aluminum alloy is used for a solid material. Since aluminum alloy is in wide-spread use as a building material and a constituent material for automobile engines, and so forth, refuse and cutting chips thereof is discharged in large quantity as industrial waste. The inventors intend to reduce the cost of production by making use of material categorized as industrial waste while contributing to solution of environmental conservation problems. Particularly, since aluminum cutting chips (curls) are a hard material made of an aluminum alloy containing silicon, copper, and so forth, in addition to working cracks already imparted thereto in the course of cutting work, the aluminum cutting chips are an inherently convenient material for use in preparation of fine particles.

It is known that aluminum and aluminum alloy cause the following chemical reactions with water molecules to occur, thereby forming hydrogen molecules:

$$Al + 3H_2O \rightarrow Al(OH)_3 + (3/2)H_2 \tag{1}$$

$$2Al(OH)_3 \rightarrow Al_2O_3 + 3H_2O \tag{2}$$

These reactions are reactions occurring to the surface of aluminum or aluminum alloy, and in the case of the mechano-corrosive reaction associated with the method according to the present invention, additional reactions are anticipated to occur as follows:

$$3Al + 3H_2O \rightarrow Al_2O_3 + AlH_3 + (3/2)H_2 \quad (3)$$

$$Al(OH)_3 + AlH_3 \rightarrow Al_2O_3 + 3H_2 \quad (4)$$

The reaction represented by reaction formula (3) is not a surface reaction but a bulk reaction occurring inside aluminum crystals, particularly, within cracks, and the same contributes to the mechano-corrosive reaction for production of massive hydrogen. Further, the reaction represented by reaction formula (4) is deemed to be an inter-facial reaction occurring in the boundary between the surface react and bulk reaction. The reaction formulas (3) and (4) represent a reaction mechanism for formation of hydrogen gas, featuring the method according to the present invention.

It has been found out as a result of studies carried out by the inventors that when friction, grinding and milling are applied to an aluminum alloy material, strain to the crystal lattice thereof and formation of microscopic cracks occur up to a depth about 30 $\mu$m from the surface thereof, so that friction energy is accumulated in a crystal surface layer to thereby cause the reactions as represented by the formulas (3) and (4), respectively, thus evolving massive hydrogen gas. The formation of the cracks and fracture inside the material is continued due to expansion in volume, attributable to reaction products formed by the mechano-corrosive reaction described as above, thereby causing self-propagation of the cracks, so that production of hydrogen gas is autonomously continued. When the fine particles generated by the friction, grinding and milling, applied to the aluminum or aluminum alloy material, are not more than about 50 $\mu$m in grain size, the reactions as represented by the formulas (3) and (4), respectively, proceed autonomously. In this case, it takes time of several days at room temperature to cause growth and accumulation of the cracks on a nanometer scale to occur inside the respective fine particles. In consequence, all the fine particles of aluminum collapse, so that there are formed fine particles of an aluminum oxide (alumina) as a final product in addition to hydrogen gas. Upon observation with a scanning electron microscope (SEM), it appears that a multitude of microscopic cracks run on the inside as well as the surface of the respective fine particles of alumina as formed, not more than about 50 $\mu$m in grain size, and the respective fine particles look like an aggregate of minute particles (about 10 $\mu$m in grain size).

Chemical reactions as represented by the formulas (1), (3), and (4), respectively, are expressed as a whole by the following chemical formula;

$$Al + (3/2)H_2O \rightarrow (1/2)Al_2O_3 + (3/2)H_2 \quad (5)$$

Accordingly, it is evident that by use of a raw material consisting of 1 mol (27 g) of an aluminum material and 1.5 mol (27 g) of water, it is possible to produce 0.5 mol (51 g) of an aluminum oxide (alumina) and 1.5 mol (3 g; 33.6 liter) of hydrogen gas.

A method of producing hydrogen gas according to claim 1 comprises the steps of causing friction and mechanical fracture accompanying the friction to occur to a metallic material under water, and increasing thereby chemical reactivity of atoms of the metallic material, in close proximity of the surface thereof; wherein water molecule are decomposed by accelerating corrosion reaction of water with the metallic material, thus producing hydrogen gas at room temperature.

According to claim 2, in the method of producing hydrogen gas as claimed in claim 1, formation of cracks and fracture inside the metallic material is continued due to expansion in volume, attributable to reaction products formed by the corrosive reaction to thereby cause self-propagation of the cracks to occur, causing evolution of hydrogen gas to autonomously continue.

According to claim 3 or 4, in the method of producing hydrogen gas as claimed in claim 1 or 2, the metallic material is preferably an aluminum or aluminum alloy material as industrial waste including refuse and cutting chips (curls) of an industrial aluminum material.

According to claim 5 or 8, in the method of producing hydrogen gas as claimed in any one of claims 1 to 4, the water is preferably pure water not substantially containing ionic impurities and organic molecules, and having an insulation resistance value not lower than 10 M$\Omega$.

Thus, the present invention provides a method of producing hydrogen gas, suitable for use as fuel of a portable fuel cell, easily and safely at a relatively low cost. It is to be pointed out that the method according to the present invention excels other methods of producing hydrogen gas using methanol as raw material, presently under studies throughout the world, in that formation of hydrogen gas proceeds satisfactorily at room temperature, a reaction rate at high temperature (on the order of 60° C.) increases by about four times, massive hydrogen gas can be produced, by-products such as CO gas are not generated, and a production apparatus is simple and inexpensive. Furthermore, it is expected that the method according to the present invention is applicable to a large-scale hydrogen gas production system using, for example, surface waves of the sea.

DETAILED DESCRIPTION OF THE PREFERRED EMBODIMENTS

Now, preferred embodiments of the present invention are described in detail hereinafter referring to the accompanying drawings. With an embodiment of a method of producing hydrogen gas according to the present invention, friction is produced on the surface of a solid material under water to the extent that strain up to a depth on the order of 0.1 $\mu$m from the surface is caused to occur to thereby cause minute cracks on the order of 30 $\mu$m to occur inside the solid material, so that friction energy is accumulated in surface layers of crystals, and reactions represented by the previously-described reaction formulas (3) and (4), respectively, occur, resulting in formation of a large quantity of hydrogen gas.

For the solid material, aluminum and aluminum alloy, having inherently strong reactivity against water molecules, are selected, and particularly, aluminum cutting chips (curls), which are industrial waste, are optimal for the purpose. Pure water not substantially containing ionic impurities and organic molecules is used for the water, and the pure water preferably has an insulation resistance value not lower than 10 M$\Omega$.

Figure 1:
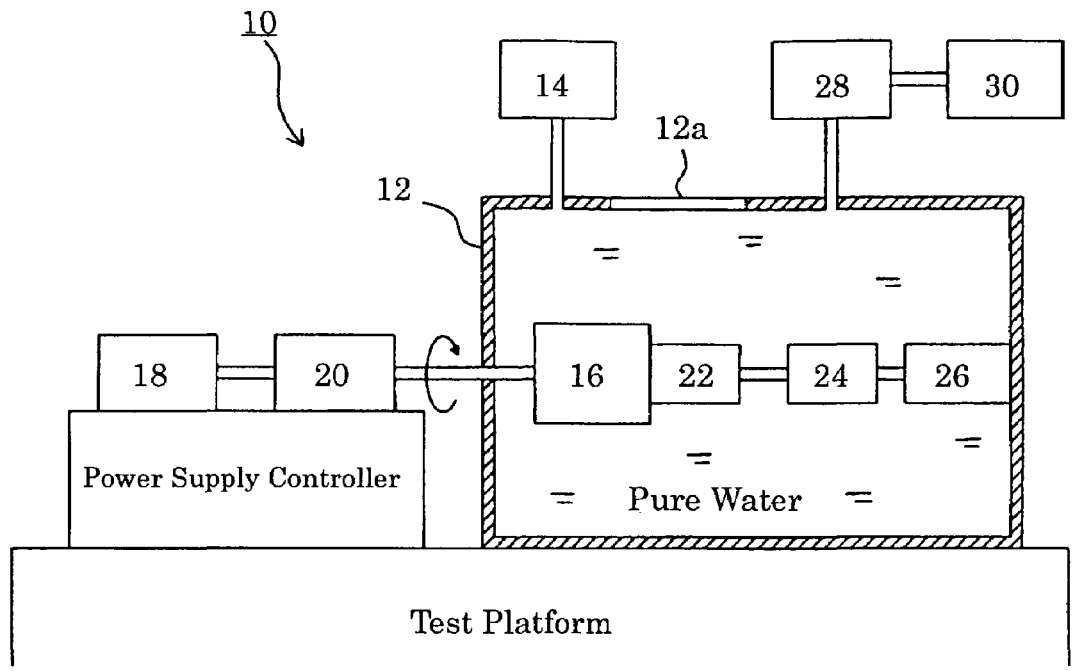
FIG. 1 is a conceptual view of a hydrogen gas production apparatus used in demonstrating an embodiment of a method of producing hydrogen gas according to the present invention.

Next, an example of a hydrogen gas production apparatus used in demonstrating the embodiment of the method of producing hydrogen gas according to the present invention will be explained referring to FIG. 1. In FIG. 1, the hydrogen gas production apparatus generally indicated by reference numeral 10 comprises a reaction chamber 12 made of a synthetic resin material excellent in water resistance. The reaction chamber 12 is filled up with the pure water. The hydrogen gas production apparatus 10 also comprises a pure water feeding means 14 for feeding pure water to the reaction chamber 12. The reaction chamber 12 is provided with an observation window 12a for observing the interior of the reaction chamber 12.

A grinding plate 16 made of a ceramic material is provided inside the reaction chamber 12. The grinding plate 16 is rotated by an electric motor 18. Reference numeral 20 denotes a reduction gear. Inside the reaction chamber 12, a solid material 22 is fixedly held by a solid material holder 24, and is pressed toward the grinding plate 16 by a compression spring 26.

The hydrogen gas production apparatus 10 further comprises a hydrogen gas recovery vessel 28 for recovering hydrogen gas as produced and a sampling vessel 30.

Production of hydrogen gas was carried out as follows: For the solid material 22, aluminum and aluminum—silicon alloy were used. Hydrogen as produced was analyzed by the gas chromatography, and fine particles of the solid material, generated by abrasion, were observed with an optical microscope, and a scanning electron microscope (SEM). Further, the composition of the fine particles as generated was analyzed by the Auger electron spectroscopy (AES) and EPMA.

It was observed that hydrogen started to be evolved in the hydrogen gas production apparatus 10 by the agency of aluminum upon the start of friction movement, and was turned into bubbles to be accumulated in the upper part of the hydrogen gas production apparatus 10. It was observed even by the naked eye that hydrogen gas burst forth, particularly, from between the grinding plate and friction faces of an aluminum material, thus having directly proven that the method according to the present invention is based on the mechano-chemical reaction. A quantity of hydrogen gas generated by the hydrogen gas production apparatus 10 was found to be in a range of about 300 to 600 cc per 1 g of aluminum. The quantity represents about half of a quantity of hydrogen gas generated as anticipated from the previously described chemical formula (5). It is deemed that this is because aluminum fine particles generated due to abrasion were diverse in grain size, and parts of the aluminum fine particles remained in the form of aluminum hydroxide [(the reaction formula (1)] since hydrogen-forming reaction at room temperature was imperfect. It was further observed that when temperature in the reaction chamber was increased to a range of 60 to 80° C., a reaction rate was increased by several times, thereby turning all the aluminum fine particles into alumina.

As a result of observation with the microscope, it was found that as for larger aluminum particles on the order of 100 $\mu$m in grain size, only the surface thereof contributed to evolution of hydrogen gas while the interior part thereof remained in the form of aluminum metal. Hydrogen gas as formed was found having a purity on the order of 98%, containing nitrogen and oxygen as impurities, which are presumed to come mainly from air dissolved in the pure water. Upon use of city water in place of the pure water, evolution of hydrogen gas by the agency of aluminum substantially stopped. It is clear from this that use of pure water is important. It was further observed that when hydrogen-forming reaction was caused to occur after mixing about 1% of a common organic substance, such as methyl alcohol or acetone, in pure water, a production quantity of hydrogen decreased down to several % of that as compared with the case of using the pure water.

Aluminum pulverized under water continued to evolve hydrogen gas for many hours. Aluminum fine particles not more than 50 $\mu$m in grain size, formed due to friction, were oxidized until even the interior part thereof was turned into white alumina, continuing to evolve hydrogen gas. In the case of particles larger in grain size, corrosion reaction occurred only to the surfaces thereof, causing hydrogen gas to be evolved, while the interior part thereof remained in the form of aluminum.

Figure 2:
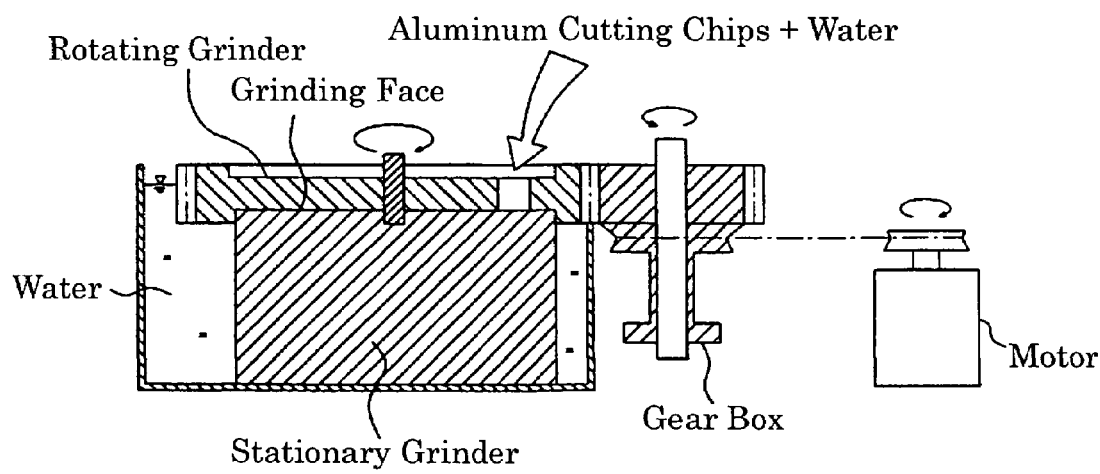
FIG. 2 is a schematic cross-sectional view of an apparatus for semi-automatically generating aluminum fine particles, developed by the inventor.

In order to incorporate the method of producing hydrogen gas according to the present invention into a potable fuel cell system, there is the need for producing a large amount of aluminum alloy fine particles. FIG. 2 is a schematic cross-sectional view of an apparatus for semi-automatically generating aluminum fine particles, developed by the inventors. The apparatus for semi-automatically generating the aluminum fine particles comprises a rotating grinder which is driven in rotation by a motor through the intermediary of a gear box, and a stationary grinder provided on the underside of the rotating grinder. The stationary grinder and rotating grinder are made of granite, respectively. An interface between the rotating grinder and stationary grinder serves as a grinding face, and the grinding face is so positioned as to be always under water. With the apparatus for generating the aluminum fine particles, aluminum cutting chips (curls) is used as aluminum alloy material to be pulverized. The aluminum cutting chips along with water are fed to the grinding face through an opening provided in the rotating grinder. Fine particles generated with the apparatus are in a range of 10 to 200 $\mu$m in grain size, and a larger particle portion of the fine particles is fed again to the grinding face to be further pulverized. Upon observation of the fine particles thus generated with the SEM, the fine particles were found to be particles in indefinite shape, having a multitude of cracks running in the surfaces thereof.

Figure 3:
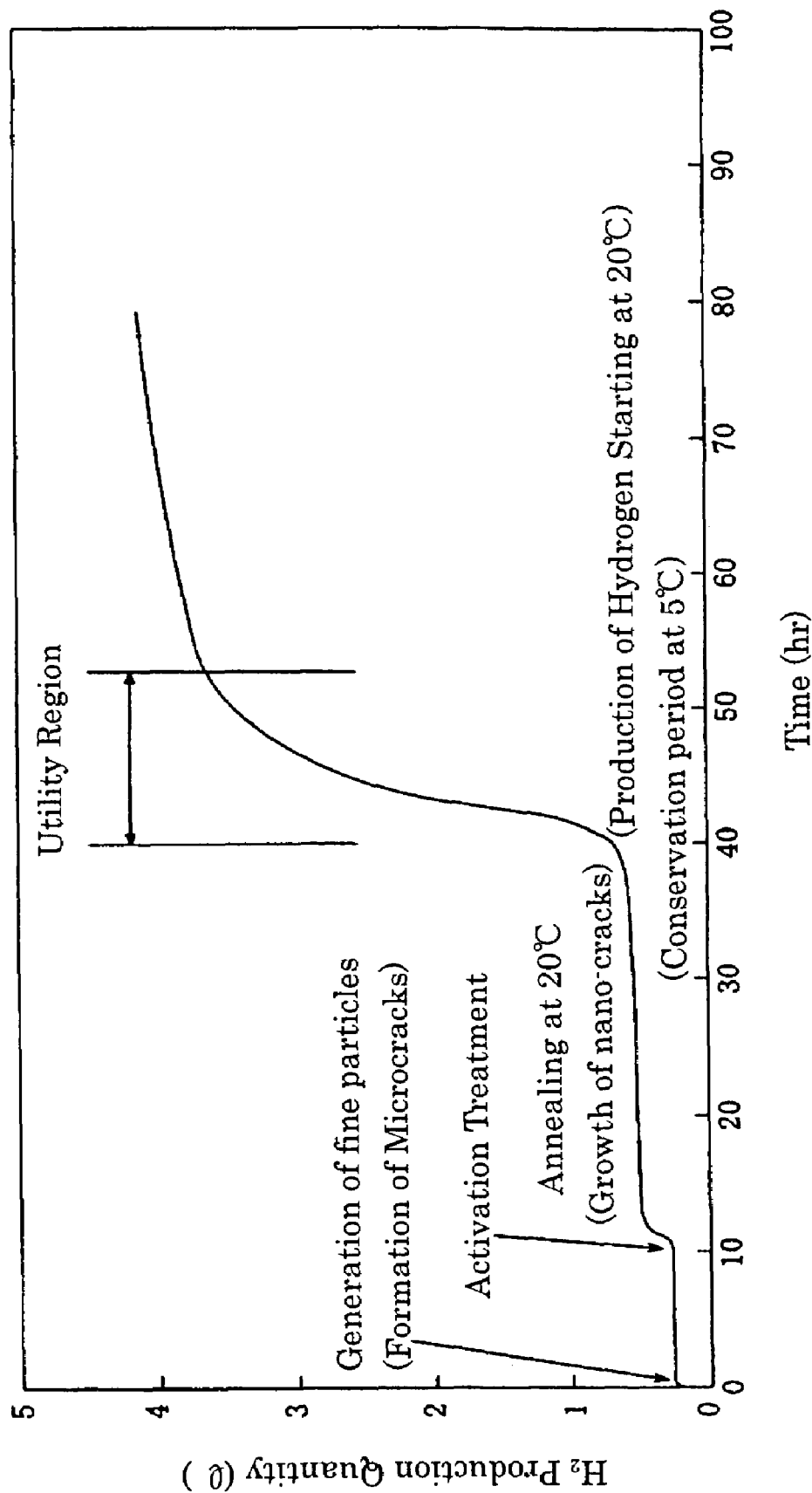
FIG. 3 is a graph showing a hydrogen gas production capacity of the aluminum fine particles generated with the apparatus shown in FIG. 2.

When generating the fine particles by use of the apparatus for semi-automatically generating the aluminum fine particles, evolution of hydrogen gas is observed, and the hydrogen gas is discharged into air. Several grams of the fine particles as generated with the apparatus were collected to examine a hydrogen gas production capacity thereof. FIG. 3 is a graph showing the results of such examination. It is shown that micro-cracks were formed in the fine particles when the fine particles were generated. Following an activation treatment whereby impacts such as temperature, ultrasonic waves, etc. were applied to the fine particles, heat treatment (annealing) at room temperature for several days was applied thereto, whereupon growth of the micro-cracks occurred to be followed by growth of more minute nano-cracks throughout the fine particles. At this point in time, the fine particles were placed under a condition of room temperature (20° C.). Thereafter, the fine particles were cooled to 5° C. and kept in this condition. Subsequently, the fine particles were placed again under the condition at 20° C., whereupon a hydrogen gas production quantity abruptly increased.

While there has been described the preferred form of the present invention, it is to be understood that the scope of the invention is not limited thereto, and many modifications and variations may be made without departing from the spirit or scope of the following claims. Obviously those modifications and variations are to be included in the scope of the invention.

For example, referring to the embodiment described in the foregoing, there have been shown the hydrogen gas production apparatus and the apparatus for generating the aluminum fine particles, used in carrying out the embodiment of the method of producing hydrogen gas according to the present invention. However, it is to be understood that those apparatus are shown only by way of example for use in carrying out the present invention.

What is claimed is:

1. A method of producing hydrogen gas comprising the steps of:
    submerging metallic material in water;
    while said metallic material is submerged, mechanically generating particles from said metallic material, whereby microscopic cracks are produced in the surfaces of said particles, and hydrogen gas is evolved from within said cracks by a mechano-corrosive reaction;
    allowing reaction products of said mechano-corrosive reaction to cause self-propagation of said cracks, thereby causing continued autonomous evolution of hydrogen gas within said cracks; and
    collecting the autonomously evolved hydrogen gas.

2. The method according to claim 1, in which said particles include particles having a grain size of not more than about 50 μm.

3. The method according to claim 1, in which said water is pure water, substantially free of ionic impurities and organic molecules.

4. The method according to claim 1, in which said step of collecting the autonomously produced hydrogen gas is carried out throughout a time interval beginning at a time before, and ending after, the rate of autonomous hydrogen gas production reaches a maximum.

5. The method of producing hydrogen gas according to claim 1, in which said metallic material is aluminum or aluminum alloy.

6. A method of producing hydrogen gas as claimed in claim 5, in which the aluminum or aluminum alloy is industrial aluminum waste.

7. The method according to claim 5, in which the aluminum or aluminum alloy is in the form of cutting chips when said particles are generated therefrom.

8. The method according to claim 5, in which said hydrogen gas produced autonomously within self propagated cracks of said particles is collected at least approximately 40 hours after said particles are generated.

9. The method according to claim 5, in which said hydrogen gas produced autonomously within self propagated cracks of said particles is collected until substantially all of said particles collapse, forming particles of aluminum oxide as a final product in addition to hydrogen gas.

10. The method according to claim 5, in which said hydrogen gas produced autonomously within self propagated cracks of said particles is collected at least until the interior of said particles is converted to aluminum oxide.

11. The method according to claim 5, in which said continued autonomous production of hydrogen gas occurs as a result of at least one of the reactions:

$$6Al + 6H_2O \rightarrow 2Al_2O_3 + 2AlH_3 + 3H_2 \text{ and}$$

$$Al(OH)_3 + AlH_3 \rightarrow Al_2O_3 + 3H_2.$$

12. The method according to claim 5, in which said particles include particles having a grain size of not more than about 50 μm.

13. The method according to claim 5, in which said water is pure water, substantially free of ionic impurities and organic molecules.

* * * * *